United States Patent
Zhang et al.

(10) Patent No.: US 7,770,065 B2
(45) Date of Patent: Aug. 3, 2010

(54) FILE DATA RESTORING SYSTEM AND METHOD OF COMPUTER OPERATING SYSTEM AND SOFTWARE THEREOF

(75) Inventors: Yue Zhang, Tianjin (CN); Tom Chen, Taipei (TW); Win-Harn Liu, Taipei (TW)

(73) Assignee: Inventec Corporation, Taipei (TW)

( * ) Notice: Subject to any disclaimer, the term of this patent is extended or adjusted under 35 U.S.C. 154(b) by 408 days.

(21) Appl. No.: 12/026,734

(22) Filed: Feb. 6, 2008

(65) Prior Publication Data

US 2009/0199039 A1  Aug. 6, 2009

(51) Int. Cl.
*G06F 11/00* (2006.01)

(52) U.S. Cl. .............................. 714/21; 714/38; 714/49; 717/174

(58) Field of Classification Search .................. None
See application file for complete search history.

(56) References Cited

U.S. PATENT DOCUMENTS

| | | | |
|---|---|---|---|
| 6,308,288 B1* | 10/2001 | Chang et al. ................... 714/38 |
| 6,385,766 B1* | 5/2002 | Doran et al. ................... 717/174 |
| 6,560,776 B1* | 5/2003 | Breggin et al. ................ 717/176 |
| 6,598,223 B1* | 7/2003 | Vrhel et al. .................... 717/174 |
| 2003/0051235 A1* | 3/2003 | Simpson ........................ 717/174 |
| 2003/0233646 A1* | 12/2003 | Cohen et al. ................... 717/174 |
| 2005/0102669 A1* | 5/2005 | Marney et al. ................. 717/174 |
| 2005/0240815 A1* | 10/2005 | Purkeypile et al. ............. 714/15 |
| 2008/0098387 A1* | 4/2008 | Lo et al. ........................ 717/174 |

* cited by examiner

*Primary Examiner*—Gabriel L Chu
(74) *Attorney, Agent, or Firm*—Workman Nydegger

(57) ABSTRACT

A file data restoring system and method of a computer operating system and software thereof are applied in the installation of an operating system into a client computer. Divide the file data corresponding to the operating system into data blocks according to an appointed data size. Generate a check code for each of the data blocks to form a sequence list of original check codes and a sequence list of target check codes. Compare the sequence list of original check codes with the sequence list of target check codes, after installing the operating system into the computer. If the comparison result is inconsistent, a restoring call information is sent out. The position of the inconsistent check code is acquired through the restoring call information and the comparison result. The original file data corresponding to the position of the check code is read and restored to a corresponding target file.

10 Claims, 6 Drawing Sheets

| Full path name of a file | Sequence of check codes |
|---|---|
| C:\abc.txt | 0x25af2584acb365 |
| C:\def.sys | 0x5483ab3585c35  0x1023df89e6c3  0xdc65893214cca |
| …… | |

Fig. 2A

| Full path name of a file | Sequence of check codes |
|---|---|
| C:\abc.txt | 0x25af2584acb365 |
| C:\def.sys | 0x5483ab3585c35  0x1453df99e6c4  0xdc65893214cca |
| …… | |

Fig. 2B

FILE DATA RESTORING SYSTEM AND METHOD OF COMPUTER OPERATING SYSTEM AND SOFTWARE THEREOF

BACKGROUND OF THE INVENTION

1. Field of Invention

The present invention relates to a method for restoring a computer system, and more particularly to a system and method for restoring a computer system and data thereof through check codes.

2. Related Art

Currently, the last step of manufacturing the computer is to install a customized operating system and associated software thereof. Due to a variety of environment or hardware factors, when a large amount of data is written into the client disc, some wrong data may be written into the disc at the same time. Therefore, to ensure that the data in the disc is correct, the disc needs to be checked and compared after the writing process.

The checking process is described as follows. Before manufacturing, a file of original check codes is made for the appointed operating system and software thereof. This file contains full path names of all the files in the original operating system and the corresponding check codes. In the last comparison step, a file of check codes of the target system is generated for each computer installed with an appointed operating system and corresponding software thereof. Then, the file of check codes of the target system is compared with the file of original check codes, and if the contents of the two files are consistent, no error occurs in the installation.

In the current manufacturing management process, if an error is found in the course of checking, the corresponding computer with error is usually returned to the preceding step for the reinstallation of the software and restoring the installation error. After that, the data is re-checked and re-compared. In the conventional checking method, the check code is corresponding to a file in a one-to-one correspondence, so when an installation error occurs, the whole file must be restored into the client computer. As a result, if the file to be restored is large, for example, an error occurs in the installation of the operating system, the above method may consumes a plenty of time for restoration, thus reducing the production efficiency.

SUMMARY OF THE INVENTION

In order to solve the problems and defects in the conventional art, the present invention is directed to a system and method for restoring a computer system and data thereof, so as to restore errors in the file data in real time without reinstalling the operating system and software thereof when an error of the system file data, especially large-capacity file data occurs, thereby reducing the file restoring time and improving the production efficiency.

The present invention provides a file data restoring system of a computer operating system and software thereof applied in the installation of an operating system and software thereof into a client computer. The system includes a check code generating module, a comparison module, and a restoring module. The check code generating module divides a plurality of file data corresponding to the operating system and software thereof into a plurality of data blocks respectively in accordance with an appointed data size, and generates a check code for each of the data blocks, so as to form a sequence list of original check codes corresponding to the original file data before the installation of the operating system and software thereof, and form a sequence list of target check codes corresponding to the target file data after the installation of the operating system and software thereof into the client computer. The comparison module compares records of a same file data in the sequence list of original check codes and the sequence list of target check codes, and sends out a restoring call information if the comparison result is inconsistent. The restoring module receives the restoring call information, acquires the position of the inconsistent check code according to the comparison result, and reads and restores the original file data corresponding to the position of the inconsistent check code in the sequence list of original check codes to the target file data corresponding to the position of the inconsistent check code in the sequence list of target check codes.

The present invention provides a file data restoring method of a computer operating system and software thereof applied in the installation of an operating system and software thereof into a client computer. The method includes the following steps. First, a plurality of file data corresponding to the operating system and software thereof is divided into a plurality of data blocks respectively in accordance with an appointed data size. Next, a check code is generated for each of the data blocks, so as to form a sequence list of original check codes corresponding to the original file data before the installation of the operating system and software thereof, and form a sequence list of target check codes corresponding to the target file data after the installation of the operating system and software thereof into the client computer. After the installation of the operating system and software thereof into the client computer, the records of the same file data in the sequence list of original check codes and the sequence list of target check codes are compared, and a restoring call information is sent if the comparison result is inconsistent. Then, the position of the inconsistent check code is acquired according to the restoring call information and the comparison result. Finally, the original file data corresponding to the position of the inconsistent check code in the sequence list of original check codes is read and restored to the target file data corresponding to the position of the inconsistent check code in the sequence list of target check codes.

In the file data restoring system and method of a computer operating system and software thereof of the present invention, files are divided into a plurality of data blocks respectively assigned with a check code. Thus, when an error of the file, especially a large-capacity file of the operating system and software thereof occurs, the data block of the original file data is acquired and restores corresponding to the position of the error check code. Therefore, the amount of the file data to be restored and installed at the same time and the data amount to be transmitted through a network may be reduced without reinstalling the whole operating system and software thereof. Thus, the production time is saved, and the efficiency of checking and restoring the product is improved.

BRIEF DESCRIPTION OF THE DRAWINGS

The present invention will become more fully understood from the detailed description given herein below for illustration only, and thus are not limitative of the present invention, and wherein:

FIGS. 2A and 2B respectively show a sequence list of original check codes and a sequence list of target check codes generated by a check code generating module according to the present invention;

DETAILED DESCRIPTION OF THE INVENTION

The features and practice of the preferred embodiments of the present invention will be illustrated in detail below with the accompanying drawings.

Figure 1:
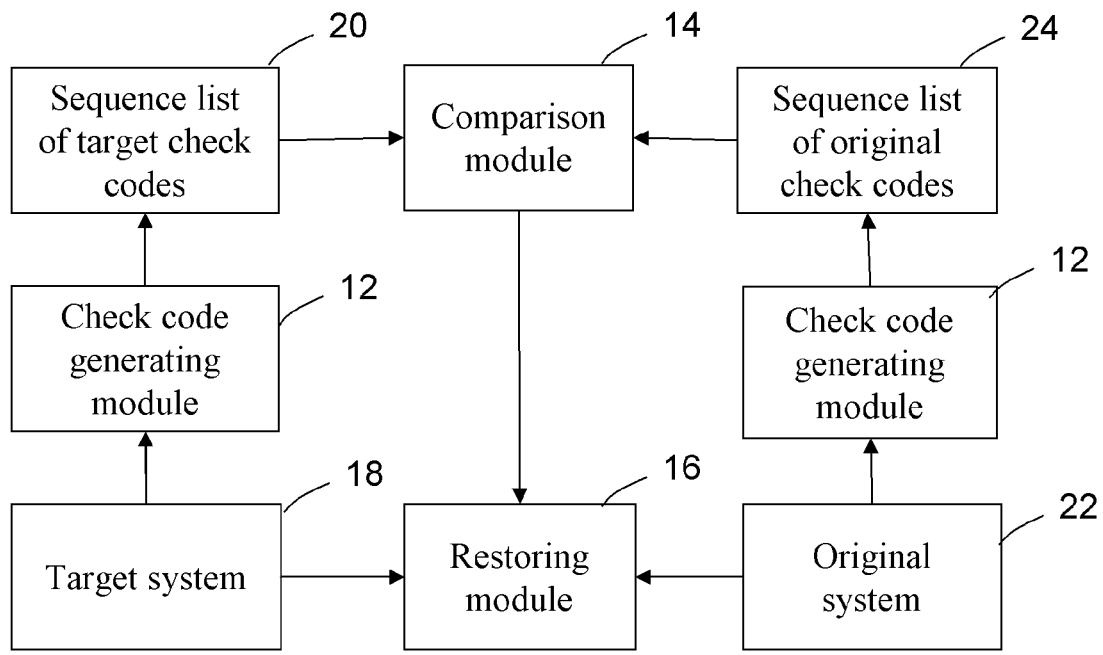
FIG. 1 is a block diagram illustrating a file data restoring system of a computer operating system and software thereof according to the present invention.

FIG. 1 illustrates a file data restoring system of a computer operating system and software thereof applied in the installation of an operating system and software thereof into a client computer.

Referring to FIG. 1, the system includes a check code generating module 12, a comparison module 14, and a restoring module 16. The check code generating module 12 generates a sequence of check codes for each file in the computer system. In addition, the check code generating module 12 generates a sequence list of original check codes 24 corresponding to the original file data of an original system 22 (i.e., a system containing an originally appointed operating system and software thereof) before the appointed operating system and software thereof are installed in the client computer, and generates a sequence list of target check codes 20 corresponding to the target file data of a target system 18 (i.e., a system containing a current operating system and software thereof) after the appointed operating system and software thereof are installed in the client computer.

The check code generating module 12 generates a record in the list for each file of the system, so as to record relative checking information of all the files in the system. Each record in the sequence list of original check codes 24 and the sequence list of target check codes 20 has the following two parts: 1) a full path name of a file in the form of a string, and serving as the unique tag for the file in the system; 2) a sequence of check codes, in which the check code generating module 12 divides a file into a plurality of data blocks in accordance with an appointed size, and calculates a check code for each data block, such that a file may be divided into a plurality of check codes in accordance with the size of the data blocks, and the plurality of check codes forms a sequence of check codes. The sequence list of original check codes 24 includes full path names of all the files in the original system 22 and a sequence of check codes formed by dividing each file data correspondingly. Similarly, the sequence list of target check codes 20 includes full path names of all the files in the target system 18 and a sequence of check codes formed by dividing each file data correspondingly.

The check code generating module 12 divides each file in the system into several data blocks so as to form a corresponding sequence of check codes based on the following formula:

$$N = \text{file size}/\text{appointed size} + 1,$$

"N" is the number of the check codes obtained by dividing a file data in the original/target system, "file size" is the size of the file data, and "appointed size" is the appointed data size for dividing, i.e., the size of the data block for calculating a check code. If the appointed data size is larger than the size of the file to be divided, only one check code will be generated. If the file still has a few bytes left after being divided into several data blocks, the $0^{th}$ to (appointed size$-1$)$^{th}$ byte form a first check code, and the (appointed size)$^{th}$ byte to double the (appointed size)$^{th}$ byte form a second check code. In this manner, the remaining bytes form the last check code.

The content of the list of check codes generated by the check code generating module 12 will be illustrated with reference to the examples shown in FIGS. 2A and 2B below. FIGS. 2A and 2B respectively show a sequence list of original check codes and a sequence list of target check codes generated by the check code generating module 12 according to the present invention.

For example, the check code generating module 12 generates a sequence list of check codes in accordance with the operating system and software thereof in the original system 22, as shown in FIG. 2A. After the corresponding file in the original system 22 is installed into the disc of the client computer through, for example, mirror image backup restoring software, the check code generating module 12 generates a new sequence list of target check codes in accordance with the file data copied and installed into the target system 18, as shown in FIG. 2B.

The comparison module 14 compares the sequence list of original check codes 24 with the sequence list of target check codes 20 respectively generated by the check code generating module 12. The comparison module 14 respectively extracts a record corresponding to the same file in the sequence list of original check codes 24 and the sequence list of target check codes 20, in order to find the file inconsistency in the installation of the operating system or software thereof through comparison. The comparison module 14 first compares full path names of the files in the two records, and then compares sequences of check codes in the two records if the above comparison result is inconsistent. Referring to the examples in FIGS. 2A and 2B, it is found from the comparison that the check code of the second data block of the file with a full path name as C:\def.sys is inconsistent with the value in the sequence list of original check codes. Thus, at this time, the comparison module 14 sends a restoring call information to the restoring module 16.

The restoring module 16 is called by the comparison module 14 when an error of a file in the target system 18 occurs, and restores file correspondingly. The restoring module 16 first acquires the position of the inconsistent check code according to the comparison result, so as to obtain the position of the data with error. Then, the restoring module 16 reads and restores the correct original file data from the position of the inconsistent check code of the corresponding file in the original system 22 to the target file corresponding to the position of the inconsistent check code in the target system 18, thereby achieving the restoration of the position data with error.

For example, referring to the examples in FIGS. 2A and 2B, the restoring module 16 reads and restores the content of the second data block from the data of the same file in the original system 22 according to the full path name of the file C:\def.sys and the check code with error to a corresponding position in the target system 18, thereby achieving the restoration and synchronization of the file.

Figure 3:
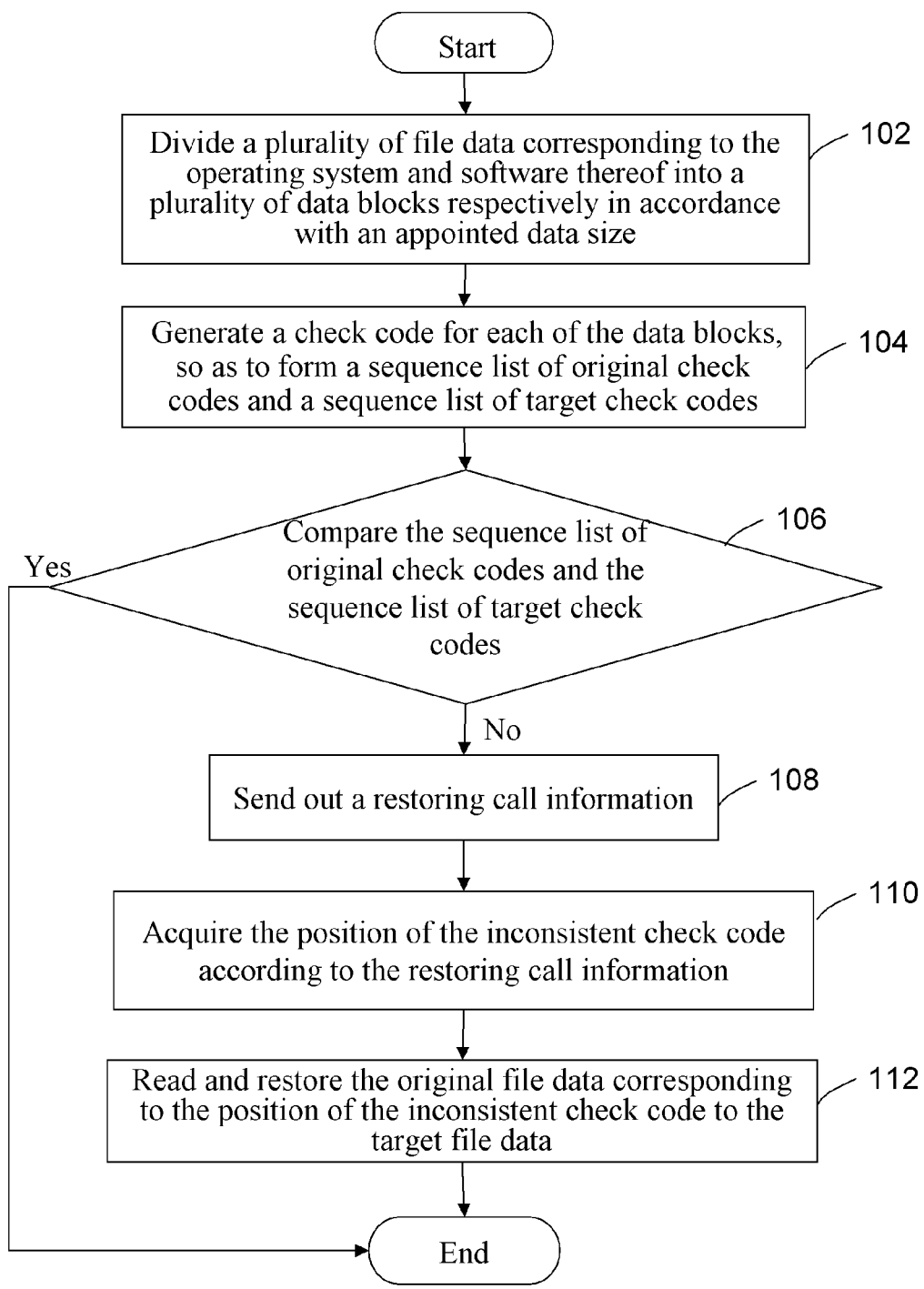
FIG. 3 is a flow chart illustrating steps of a file data restoring method of a computer operating system and software thereof according to the present invention.

Next, referring to FIG. 3, a flow chart illustrating steps of a file data restoring method of a computer operating system and software thereof of the present invention is shown. In FIG. 3, the method includes the following steps. First, a plurality of file data corresponding to the operating system and software thereof is divided into a plurality of data blocks respectively in accordance with an appointed data size (Step 102). Next, a check code for each of the data blocks is generated, so as to form a sequence list of original check codes corresponding to the original file data before the operating system and software thereof are installed in the client computer, and form a sequence list of target check codes corresponding to the target file data after the operating system and software thereof are installed in the client computer (Step 104). After the operating system and software thereof are installed into the client computer, records of the same file data in the sequence list of original check codes and the sequence list of target check codes are compared (Step 106), and a restoring call information is sent if the comparison result is inconsistent (Step 108). Then, the position of the inconsistent check code is acquired according to the restoring call information and the comparison result (Step 110). Finally, the original file data corresponding to the position of the inconsistent check code in the sequence list of original check codes is read and restored to the target file data corresponding to the position of the inconsistent check code in the target system (Step 112).

Figure 4:
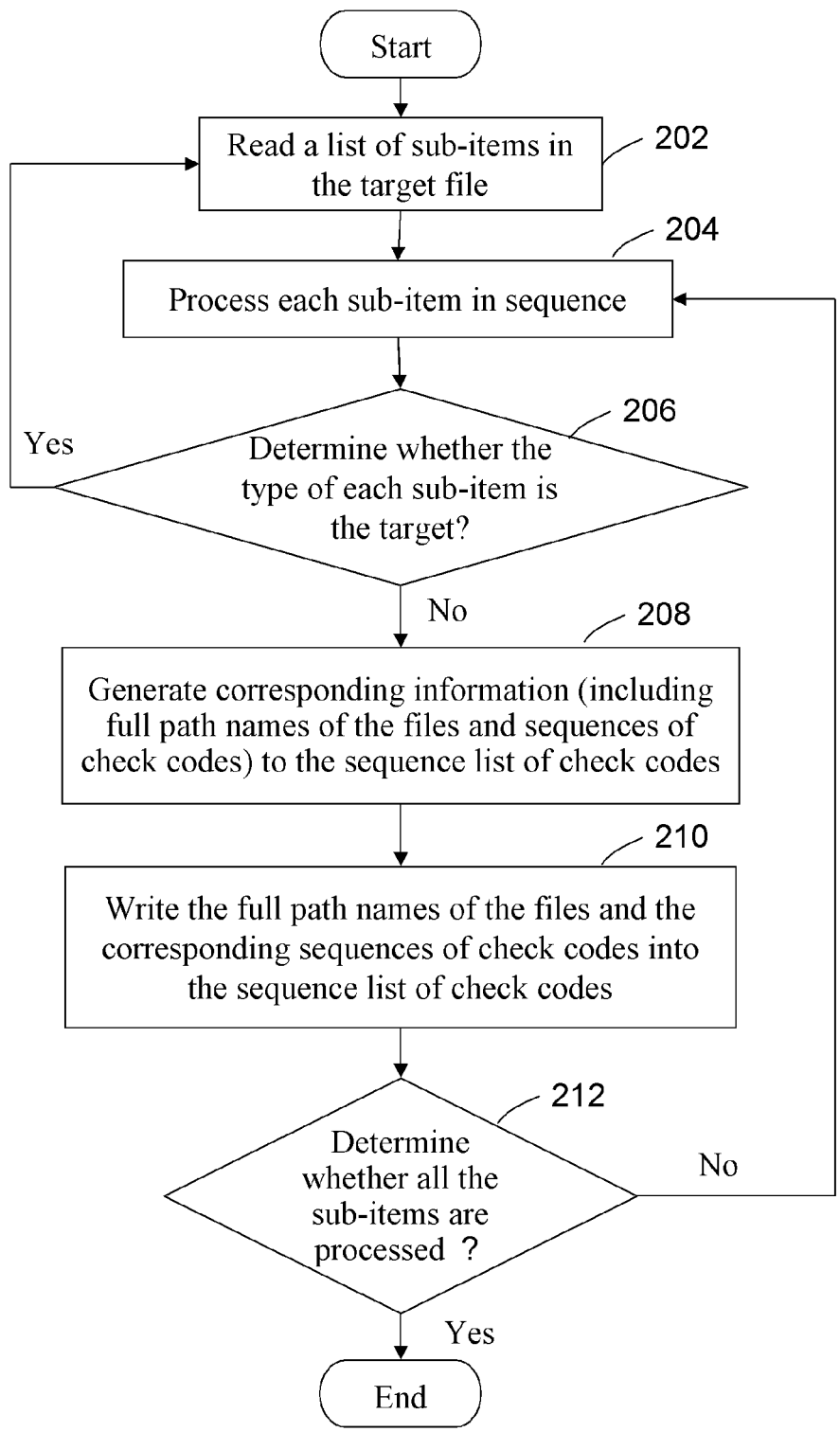
FIG. 4 is a flow chart illustrating steps of generating a sequence list of check codes according to the file data restoring method of the present invention.
Figure 5:
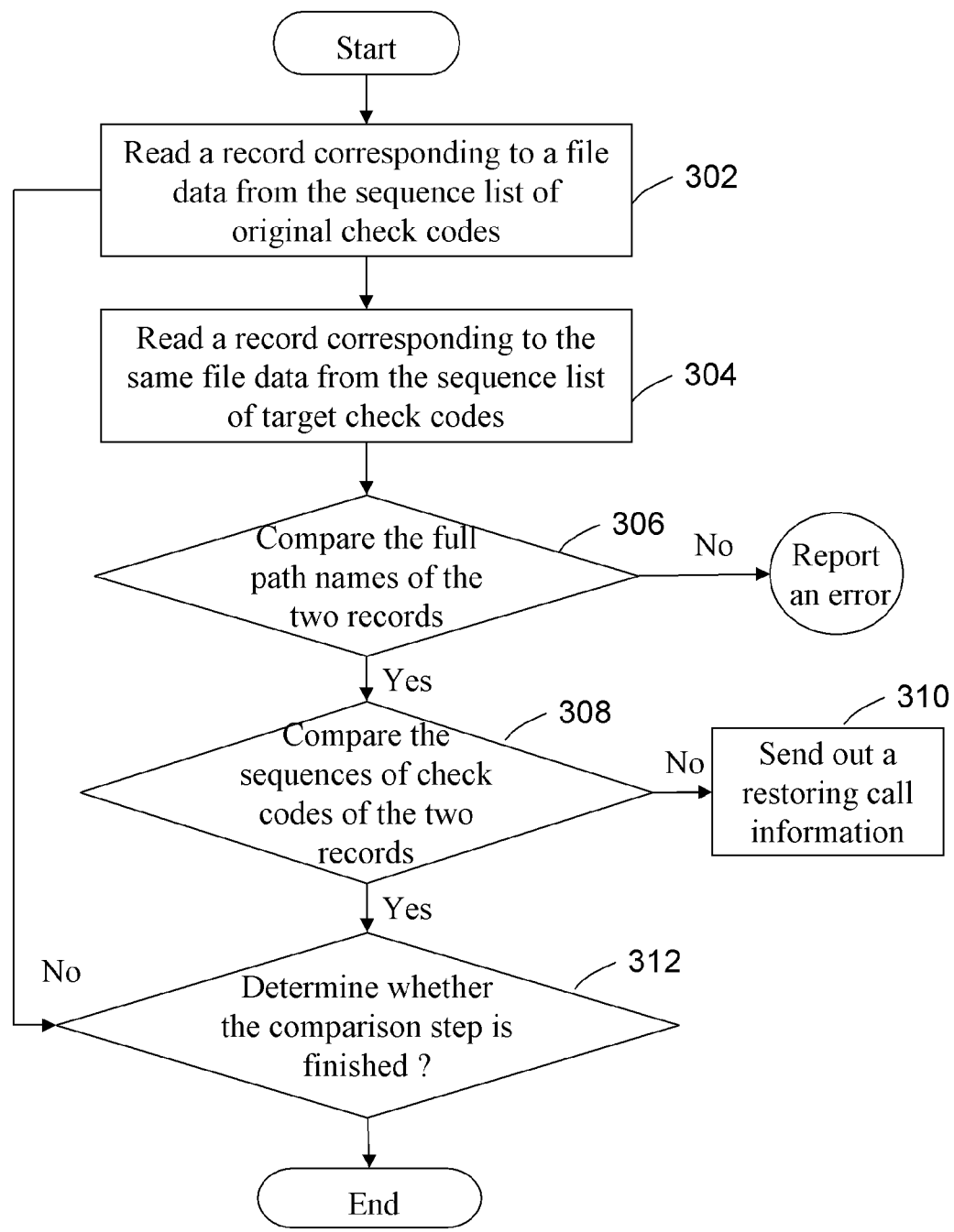
FIG. 5 is a flow chart showing the steps of comparing the lists of check codes according to the file data restoring method of the present invention.
Figure 6:
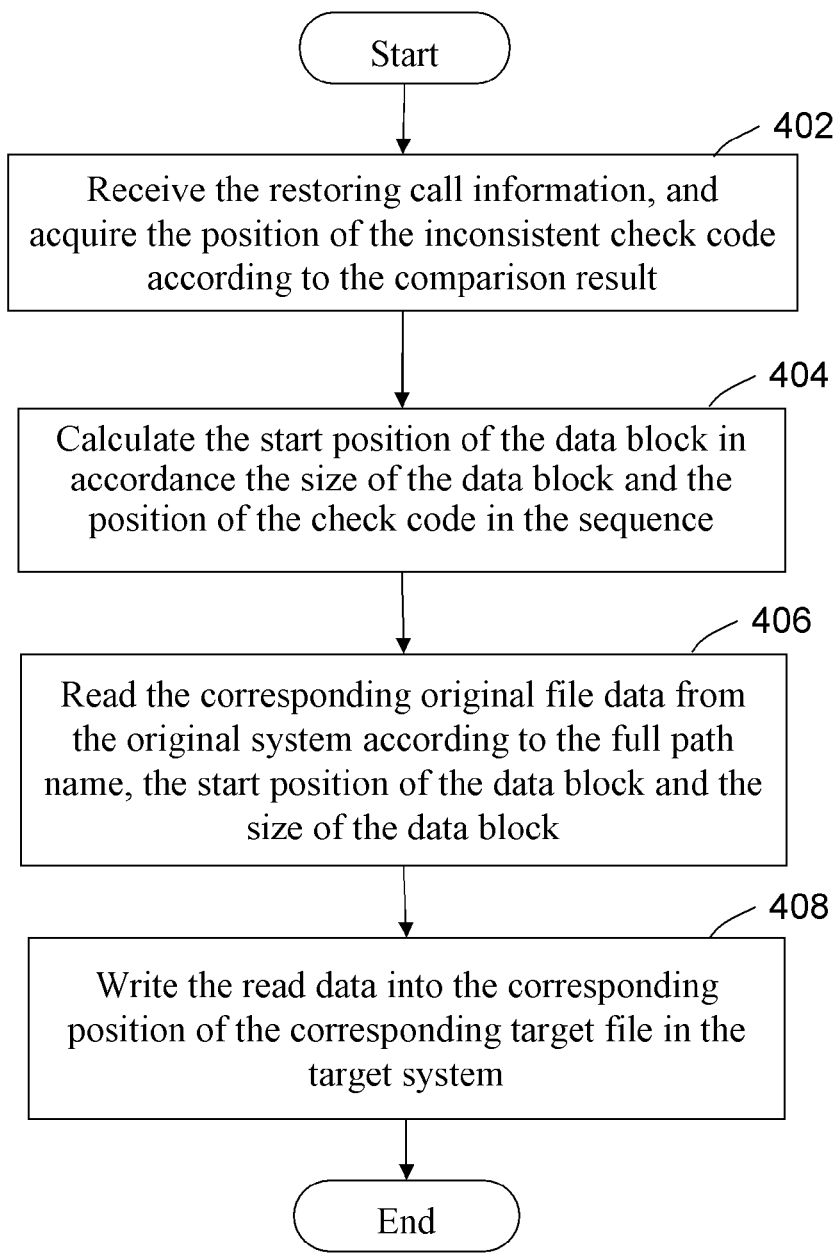
FIG. 6 is a flow chart illustrating steps of restoring the data of the target file with error according to the file data restoring method of the present invention.

The steps of the file data restoring method of a computer operating system and software thereof of the present invention are illustrated in detail below with reference to FIGS. 4, 5, and 6. FIG. 4 is a flow chart illustrating steps of generating a sequence list of check codes according to the file data restoring method of the present invention. FIG. 5 is a flow chart illustrating steps of comparing the lists of check codes according to the file data restoring method of the present invention. FIG. 6 is a flow chart illustrating steps of restoring data of the target file with error according to the file data restoring method of the present invention.

As shown in FIG. 4, a sequence list of check codes corresponding to a file of the operating system and software thereof in the original system or target system is generated by the following steps. First, a list of sub-items in the target file of the system is read (Step 202). Each sub-item in sequence is processed (Step 204). Then, it is determined whether the type of each sub-item is the target (Step 206). If yes, return to Step 202 to continue reading other sub-items as the sub-item of a directory. If not, a corresponding information (including full path names of the files and sequences of check codes) is generated to the sequence list of check codes (Step 208). In addition, the sequence list of check codes generates a record for each file in the system, so as to record relative checking information of all the files in the system. Each record has the following two parts: 1) a full path name of a file in the form of a string and serving as the unique tag for the file in the system; 2) a sequence of check codes, in which a file is divided into a plurality of data blocks in accordance with an appointed size, and a check code is calculated for each data block, such that a file may be divided into a plurality of check codes in accordance with the size of the data blocks, and the plurality of check codes forms a sequence of check codes. The sequence list of original check codes includes full path names of all the files in the original system and a sequence of check codes formed by dividing each file data correspondingly. Similarly, the sequence list of target check codes includes full path names of all the files in the target system and a sequence of check codes formed by dividing each file data correspondingly.

Each file in the system is divided into several data blocks so as to form a corresponding sequence of check codes based on the following formula:

$N$=file size/appointed size+1,

"N" is the number of the check codes obtained by dividing a file data in the original/target system, "file size" is the size of the file data, and "appointed size" is the appointed data size for dividing, i.e., the size of the data block for calculating a check code. If the appointed data size is larger than the size of the file to be divided, only one check code will be generated. If the file still has a few bytes left after being divided into several data blocks, the $0^{th}$ to (appointed size$-1$)$^{th}$ byte forms a first check code, and the (appointed size)$^{th}$ byte to double the (appointed size)$^{th}$ byte forms a second check code. In this manner, the remaining bytes form the last check code.

Thus, the full path names of the files and the corresponding sequences of check codes are written into the lists of check codes (Step 210), so as to obtain a sequence list of original check codes for the original system and a sequence list of target check codes for the target system.

FIG. 5 is a flow chart showing the steps of comparing the lists of check codes according to the file data restoring method of the present invention. Referring to FIG. 5, first, a record corresponding to a file data is read from the sequence list of original check codes (Step 302), and then a record corresponding to the same file data is read from the sequence list of target check codes (Step 304). First, the full path names of the two records are compared (Step 306). If inconsistent, an error is reported. If consistent, the sequences of check codes of the two records are compared continuously (Step 308). If the above comparison result is inconsistent, a restoring call information is sent (Step 310). If consistent, it is determined whether the comparison step is finished (Step 312). If the comparison step is not finished, return to Step 302 to repeat the preceding step to compare the remaining records in the sequence lists of check codes till all the records are compared. Thus, the process ends.

FIG. 6 is a flow chart illustrating steps of restoring the data of the target file with error according to the file data restoring method of the present invention. Referring to FIG. 6, first, the position of the inconsistent check code is acquired according to the comparison result, and the position of the data with error is thus obtained (Step 402). Next, the start position of the data block is calculated in accordance with the size of the data block and the position of the check code in the sequence (Step 404). Afterwards, the corresponding original file data is read from the original system according to the full path name, the start position of the data block and the size of the data block (Step 406). Then, the correct original file data is written into the corresponding position of the corresponding target file in the target system (Step 408), thus achieving the restoration of the position data with error.

What is claimed is:

1. A file data restoring system of a computer operating system and software thereof, applied in an installation of an operating system and software thereof into a client computer, the system comprising:

a check code generating module, for dividing a plurality of file data corresponding to the operating system and software thereof into a plurality of data blocks respectively in accordance with an appointed data size, and generating a check code for each of the data blocks, so as to form a sequence list of original check codes corresponding to an original file data before the installation of the operating system and software thereof, and form a sequence list of target check codes corresponding to a target file data after the installation of the operating system and software thereof into the client computer;

a comparison module, for comparing records of a same file data in the sequence list of original check codes and the sequence list of target check codes, and sending out a restoring call information if a comparison result is inconsistent; and a restoring module, for receiving the restoring call information, acquiring the position of the inconsistent check code according to the comparison result, and reading and restoring the original file data corresponding to the position of the inconsistent check code in the sequence list of original check codes to the target file data corresponding to the position of the inconsistent check code in the sequence list of target check codes.

2. The restoring system as claimed in claim 1, wherein, in accordance with the operating system and software thereof, the sequence list of original check codes and the sequence list of target check codes respectively comprise a full path name of the original file data with a sequence of original check codes corresponding to the original file data, and a full path name of the target file data with a sequence of target check codes corresponding to the target file data.

3. The restoring system as claimed in claim 2, wherein the comparison module compares the full path name of the original file data and the sequence of original check codes, with the full path name of the target file data and the sequence of target check codes.

4. The restoring system as claimed in claim 2, wherein the restoring module reads the corresponding restoring data from the original file data according to the full path name of the original/target file data, a start position of the data block corresponding to the inconsistent check code, and the appointed data size for dividing the file data.

5. The restoring system as claimed in claim 1, wherein the file data corresponding to the operating system and software thereof is divided in accordance with the appointed data size based on a formula as follows:

$$N = \text{file size}/\text{appointed size} + 1,$$

wherein "N" is the number of the check codes obtained by dividing the file data, "file size" is the size of the file data, and "appointed size" is an appointed data size.

6. A file data restoring method of a computer operating system and software thereof, applied in an installation of an operating system and software thereof into a client computer, the method comprising:

dividing a plurality of file data corresponding to the operating system and software thereof into a plurality of data blocks respectively in accordance with an appointed data size;

generating a check code for each of the data blocks, so as to form a sequence list of original check codes corresponding to an original file data before the installation of the operating system and software thereof, and form a sequence list of target check codes corresponding to a target file data after the installation of operating system and software thereof into the client computer;

after the installation of the operating system and software thereof into the client computer, comparing records of a same file data in the sequence list of original check codes and the sequence list of target check codes, and sending a restoring call information if the comparison result is inconsistent;

acquiring the position of the inconsistent check code according to the restoring call information and the comparison result; and reading and restoring the original file data corresponding to the position of the inconsistent check code in the sequence list of original check codes to the target file data corresponding to the position of the inconsistent check code in the sequence list of target check codes.

7. The restoring method as claimed in claim 6, wherein, in accordance with the operating system and software thereof, the sequence list of original check codes and the sequence list of target check codes respectively record a full path name of the original file data with a sequence of original check codes corresponding to the original file data, and a full path name of the target file data with a sequence of target check codes corresponding to the target file data.

8. The restoring method as claimed in claim 7, wherein the step of comparing the sequence list of original check codes with the sequence list of target check codes corresponding to the plurality of file data further comprises:

extracting two records of a same file in the plurality of file data from the sequence list of original check codes and the sequence list of target check codes respectively;

comparing the full path name of the original file data and the full path name of the target file data of the two records;

if consistent, comparing the sequence of original check codes and the sequence of target check codes of the two records.

9. The restoring method as claimed in claim 7, wherein the original file data corresponding to the position of the inconsistent check code is read according to the full path name of the original/target file data, a start position of the data block corresponding to the inconsistent check code, and the appointed data size for dividing the file data.

10. The restoring method as claimed in claim 6, wherein the file data corresponding to the operating system and software thereof is divided in accordance with the appointed data size based on a formula as follows:

$$N = \text{file size}/\text{appointed size} + 1,$$

wherein "N" is the number of the check codes obtained by dividing the file data, "file size" is the size of the file data, and "appointed size" is an appointed data size.

* * * * *